(12) United States Patent
Aureglia et al.

(10) Patent No.: US 7,392,478 B2
(45) Date of Patent: Jun. 24, 2008

(54) METHOD AND SYSTEM IN AN ELECTRONIC SPREADSHEET FOR HANDLING GRAPHICAL OBJECTS REFERRING TO WORKING RANGES OF CELLS IN A COPY/CUT AND PASTE OPERATION

(75) Inventors: Jean-Jacques Aureglia, St Martin du Var (FR); Frederic Bauchot, St Jeannet (FR); Catherine Soler, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 10/468,544

(22) PCT Filed: Jan. 31, 2002

(86) PCT No.: PCT/EP02/01953

§ 371 (c)(1),
(2), (4) Date: Dec. 29, 2003

(87) PCT Pub. No.: WO02/069212

PCT Pub. Date: Sep. 6, 2002

(65) Prior Publication Data

US 2004/0143788 A1 Jul. 22, 2004

(30) Foreign Application Priority Data

Feb. 27, 2001 (EP) .................. 01480018

(51) Int. Cl.
*G06F 17/00* (2006.01)

(52) U.S. Cl. ..................................... 715/503

(58) Field of Classification Search ................ 715/503, 715/504, 509, 530
See application file for complete search history.

(56) References Cited

U.S. PATENT DOCUMENTS 5,272,628 A * 12/1993 Koss ......................... 715/503
5,471,612 A * 11/1995 Schlafly ..................... 715/503
5,742,828 A * 4/1998 Canady et al. ............. 717/144

(Continued)

OTHER PUBLICATIONS

Levoy, Marc. "Spreadsheets for images", International Conference on Computer Graphics and Interactive Techniques, Proceedings of the 21st annual conference on Computer graphics and interactive techniques, ACM Press, 1994, pp. 139-146.*

(Continued)

*Primary Examiner*—Stephen Hong
*Assistant Examiner*—Adam M. Queler
(74) *Attorney, Agent, or Firm*—Schmeiser, Olsen & Watts; David L. Adour

(57) ABSTRACT

A system and method of copying and pasting a source range of cells onto a destination range of cells in a spreadsheet. The source range includes at least one working range of cells and at least one fastening range of cells that include graphical objects. The source range of cells and any graphical objects whose associated fastening range of cells is included therein are copied onto the destination range of cells. When the cell identifications are relative rather than absolute, means for identifying the working range of cells within the source range of cells are replaced by means for identifying the copied working range of cells within the destination range of cells.

20 Claims, 11 Drawing Sheets

U.S. PATENT DOCUMENTS

| | | | | |
|---|---|---|---|---|
| 5,881,381 | A | 3/1999 | Yamashita et al. | 715/509 |
| 6,317,758 | B1 * | 11/2001 | Madsen et al. | 715/504 |
| 6,910,017 | B1 * | 6/2005 | Woo et al. | 705/10 |
| 6,948,154 | B1 * | 9/2005 | Rothermel et al. | 717/128 |
| 2002/0069220 | A1 * | 6/2002 | Tran | 707/503 |

OTHER PUBLICATIONS

Microsoft® Excel 2000 © 1999, Microsoft Corp., Screenshots.*

Bauchot, F. "Method and System in an Electronic spreadsheet for Persistently Copy-Pasting a Source Range of Cells onto One or More Destination Ranges of Cells", IBM Patent Application, filed May 23, 2001, U.S. Appl. No. 09/864,628.

Bauchot, F. "Method and System in an Electronic Spreadsheet for Persistently Self-Replicating Multiple Ranges of Cells Through a Copy-Paste Operation", IBM Patent Application, filed Jun. 22, 2001, U.S. Appl. No. 09/887,602.

* cited by examiner

300

| | |
|---|---|
| Undo | Ctrl+Z |
| Cut | Ctrl+X |
| Copy | Ctrl+C |
| Paste | Ctrl+V |
| Clear... | Del |
| Clear Styles | |
| Self Replication | |
| Paste Special | |
| Paste Link | |
| Copy Down | Ctrl+D |
| Copy Right | Ctrl+T |
| GoTo... | Ctrl+G |
| Find & Replace | Ctrl+F |
| Check Spelling | Ctrl+F2 |
| Manage Links | |
| Script & Macros | |

| | Sort by X | Sort by Y |
|---|---|---|
| | X | 10*SIN(X/10) |
| | 1.00 | 1.00 |
| | 5.00 | 4.79 |
| | 9.00 | 7.83 |
| | 13.00 | 9.64 |
| | 17.00 | 9.92 |
| | 21.00 | 8.63 |
| | 25.00 | 5.98 |
| | 29.00 | 2.39 |
| | 33.00 | -1.58 |
| | 37.00 | -5.30 |
| | 41.00 | -8.18 |
| | 45.00 | -9.78 |
| | 49.00 | -9.82 |
| | 53.00 | -8.32 |
| | 57.00 | -5.51 |
| | 61.00 | -1.82 |
| | 65.00 | 2.15 |
| | 69.00 | 5.78 |
| | 73.00 | 8.50 |
| | 77.00 | 9.88 |

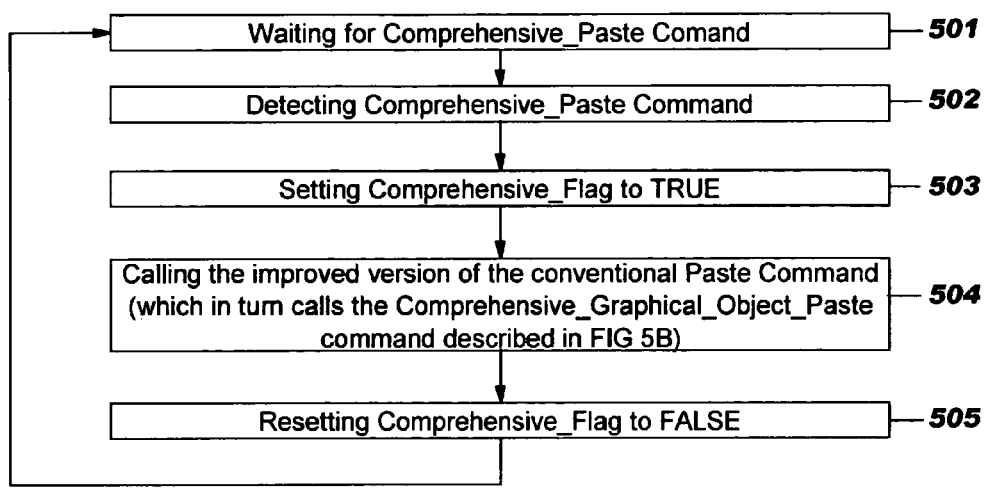

METHOD AND SYSTEM IN AN ELECTRONIC SPREADSHEET FOR HANDLING GRAPHICAL OBJECTS REFERRING TO WORKING RANGES OF CELLS IN A COPY/CUT AND PASTE OPERATION

FIELD OF THE INVENTION

The present invention relates to the field of information processing by digital computers, and more particularly to a method and system, in an electronic spreadsheet, for handling graphical objects referring to working ranges of cells in a copy-and-paste or a cut-and-paste operation.

BACKGROUND

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is laborious. The process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerised replacement for the traditional financial modeling tools: the accountant's columnar pad, pencil, and calculator. In some regards, spreadsheet programs are to those tools as word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range, as long as they are arranged as a contiguous set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, by using imbedded formulas for instance, the spread of information may be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

For this purpose, electronic spreadsheets systems include different means helping the user both to modify inputs and to visualize the resulting effect.

In the former case, user defined push-buttons with associated software or pieces of code are typical examples of built-in tools available within conventional electronic spreadsheets for manipulating individual cells or ranges of cells.

In the later case, user defined charts are typical examples of built-in tools available within conventional electronic spreadsheets for seeing the resulting effect of an input change. Indeed a chart makes relationships among numbers easy to see because it turns numbers into shapes (lines, bars, slices of a pie), and the shapes can then be compared with one another.

The ranges of cells, whether they include one or several cells, typically constitute the basic objects handled by and associated with both push-buttons and charts. In the following, such ranges of cells will be referred to as "working ranges" Objects like push-buttons and charts can be "fastened" to the range of cells they overlay on the spreadsheet user computer display. In the following, such ranges will be referred to as the "fastening ranges".

When a fastening range is copied/cut and pasted within a conventional electronic spreadsheet, the objects that are included are also copied/cut and pasted, so that the resulting pasted range contains the same objects as the original fastening range. Therefore, the pasted range is also a fastening range. Any object within the pasted fastening range owns the same attributes as the corresponding original object does. This does not normally present a problem for most of the object attributes (for instance, a pie chart is expected to be copied/cut and pasted into a pie chart, not a bar chart).

Nevertheless, some limitations exist in conventional electronic spreadsheets for the working range attribute. Indeed, with conventional electronic spreadsheets, the working ranges associated with a copied/cut and pasted object are exactly the same as the ones associated with the original object. This is not the normally expected result if the working range is included in, or equal to, the fastening range: in this case, the working range is expected to be treated as a regular relative range, so that the copied/cut and pasted working range occupies within the copied/cut and pasted fastening range the same relative position as the original working range within the original fastening range.

As the spreadsheet user inappropriately expects that the copied/cut and pasted working range is included in the copied/cut and pasted fastening range, he or she may erroneously interpret the result of a change within the copied/cut and pasted working range. This problem is particularly severe in the case of a cut and paste operation, as the cut and pasted objects within a cut and pasted fastening range are associated with working ranges which have been cut and which are thus emptied. In the case of a chart object, the resulting shape (line, bar, slice of a pie) is simply absent. The present invention offers a user-friendly solution to this problem by giving to the electronic spreadsheet user the choice between a conventional copy/cut and paste operation and an enhanced copy/cut and paste operation where working ranges within fastening ranges are treated as relative ranges.

SUMMARY

The present invention is directed to a method and system, in an electronic spreadsheet, for handling graphical objects referring to working ranges of cells in a copy-and-paste or a cut-and-paste operation.

More particularly the present invention discloses a system and method of copying and pasting a source range of cells onto a destination range of cells in a multi-dimensional spreadsheet comprising a plurality of cells identified by a cell address along each dimension, a range of cells comprising one or more cells, said source range of cells comprising one or more working ranges of cells, and one or more fastening ranges of cells in which one or more graphical objects are represented, said one or more graphical objects being associated with the one or more working ranges of cells.

The method comprises the steps of:

selecting a source range of cells;

selecting a destination range of cells;

copying onto the selected destination range of cells, the selected source range of cells with any graphical object whose fastening range of cells is included in the source range of cells; and for each graphical object whose fastening range of cells is copied onto the destination range of cells and for each working range of cells associated with the graphical object:

replacing means for identifying the working range of cells within the source range of cells with means for identifying the copied working range of cells within the destination range of cells if the identifying means are not absolute, wherein the means for identifying are preferably a name or an address.

BRIEF DESCRIPTION OF THE DRAWINGS

The invention may be understood by reference to the following detailed description of an illustrative detailed embodiment when read in conjunction with the accompanying drawings, wherein:

FIGS. 4A, 4B, 4C and 4D show a typical spreadsheet structure according to a preferred embodiment of the present invention.

FIGS. 5A and 5B are flow charts illustrating a preferred method for the "paste" operation according to the present invention.

FIG. 6 illustrates the structure of the "Working Range of Cells" (WROC) Table, according to a preferred embodiment of the present invention.

DETAILED DESCRIPTION

System Hardware

Figure 1A:
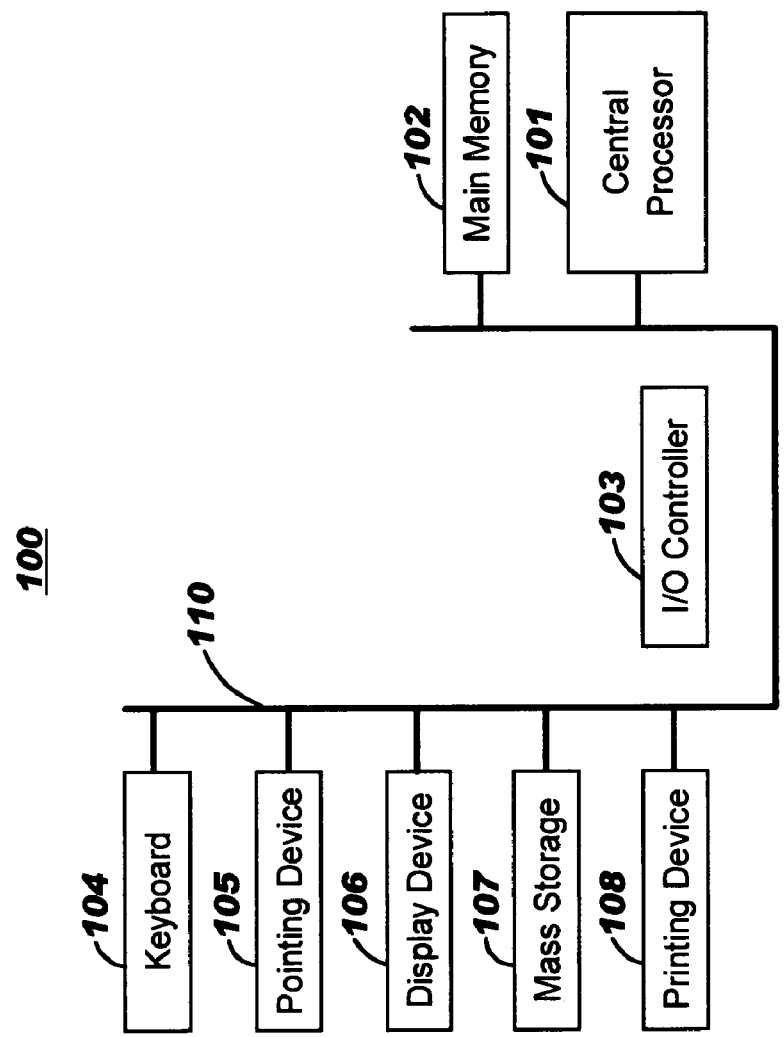
FIG. 1A is a schematic view of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.).

Figure 1B:
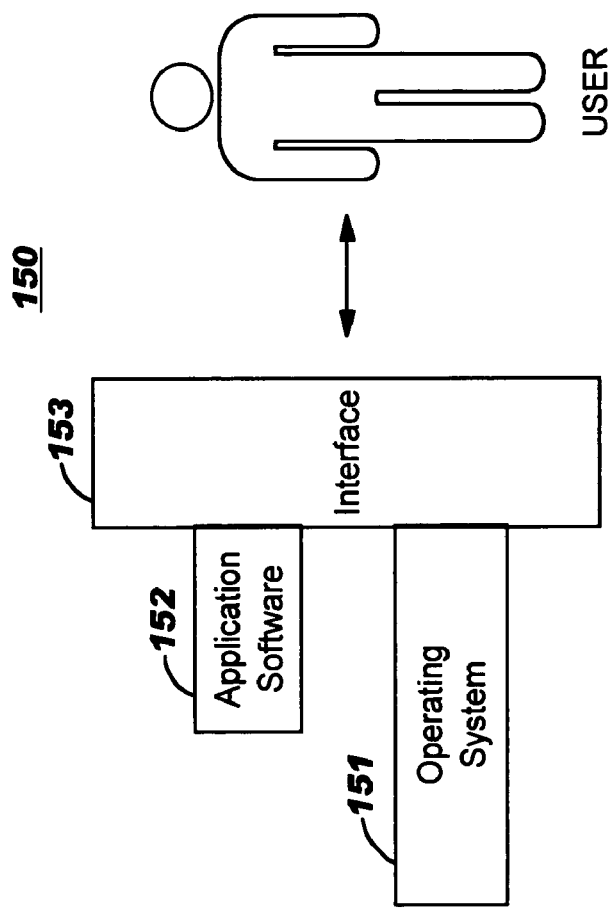
FIG. 1B is a schematic view a software system including an operating system, an application software, and a user interface for carrying out the present invention.

Illustrated in FIG. 1B, a computer software system 150 is provided for directing the operation of the computer system 100. Software system 150, which is stored in system memory 102 and on mass storage 107, includes a kernel or operating system 151 and a shell or interface 153. One or more application programs, such as application software 152, may be "loaded" (i.e., transferred from storage 107 into memory 102) for execution by the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

A. Introduction

The following description focuses on preferred embodiments of the present invention, which are embodied in spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the description of the exemplary embodiments which follows is for purposes of illustration and not limitation.

Figure 1C:
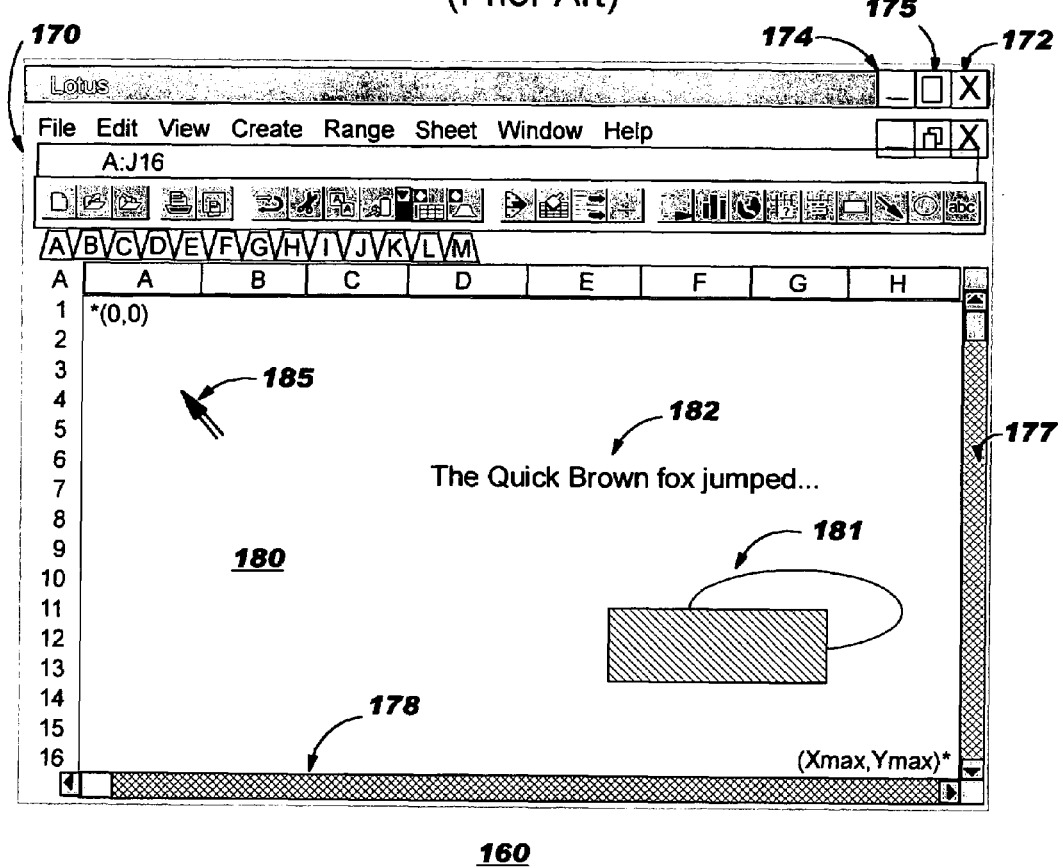
FIG. 1C illustrates the basic architecture and functionality of a graphical user interface in which the present invention may be embodied.

Referring now to FIG. 1C, the system 100 includes a windowing interface or workspace 160. Window 160 may be a rectangular, graphical user interface (GUI) for display on screen 106; additional windowing elements may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Windowing interface 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 160 may be closed, re-sized, or scrolled by "clicking" (selecting) screen components 172, 174/5, and 177/8, respectively.

In a preferred embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., *Microsoft Mouse Programmers Reference*, Microsoft Press, 1989. The general construction and operation of a GUI event-driven system, such as Windows, is also known in the art: see, e.g., Petzold, C., *Programming Windows*, Second Edition, Microsoft Press, 1990.

B. Preferred Interface

Figure 2A:
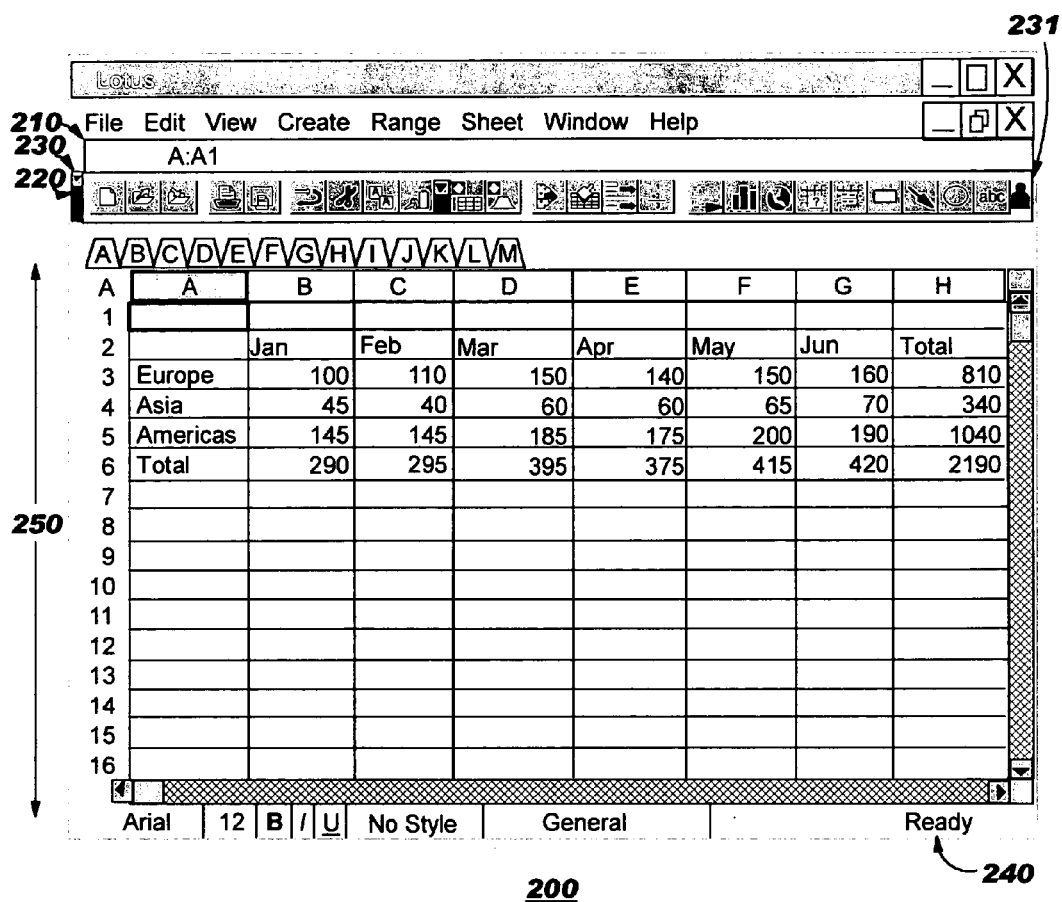
FIG. 2A shows a spreadsheet notebook interface according to a preferred embodiment of the present invention.

Shown in FIG. 2A, a spreadsheet notebook interface of the present invention will now be described. The spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
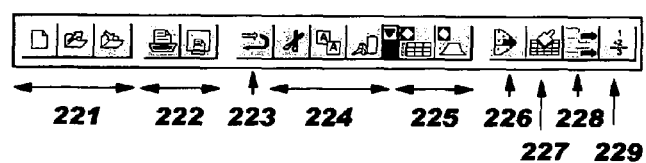
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy, and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In a preferred embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a two-dimensional spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active one (i.e., the cell that is currently selected).

Figure 2C:
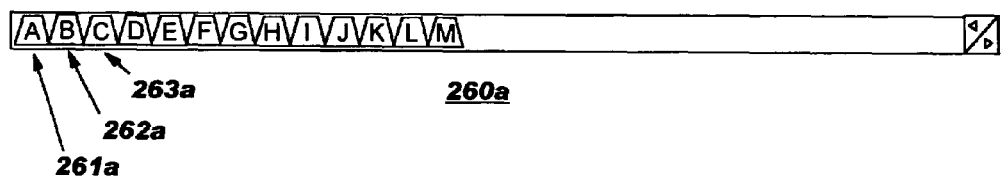
FIGS. 2C and 2D show page identifiers for rapidly accessing and manipulating individual pages of the notebook interface shown in FIG. 2A.
Figure 2D:
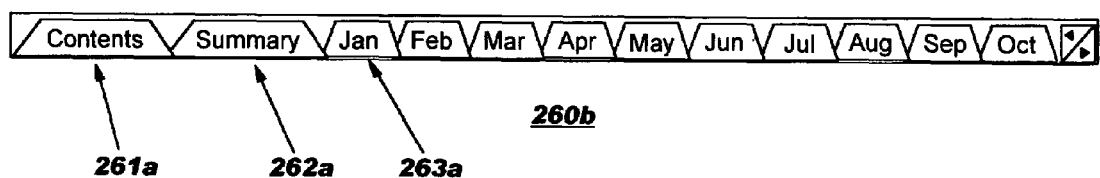

As shown in FIGS. 2C-D, individual notebook pages are identified by page identifiers 260, preferably located along one edge of a notebook. In a preferred embodiment, each page identifier is in the form of a tab member (e.g., members 261a, 262a, 263a) situated along a top edge of the notebook. Each tab member may include representative indicia, such as textual or graphic labels, including user selected titles representing the contents of corresponding pages. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (*Getting Started, User's Guide and Building Spreadsheet Applications*), available from Borland International.

Range Dependent Objects in a Copy/Cut and Paste Operation

A. Introduction

Conventional electronic spreadsheets include built-in means allowing spreadsheet users to easily apply changes to ranges of cells and to easily represent the resulting effects on other ranges of cells. Typical examples of such means are push-button objects, with their associated macros or scripts, and chart objects. These objects are linked to two different types of ranges of cells: the so-called "Working Ranges of Cells" and the so-called "Fastening Ranges of Cells".

Figure 4A:
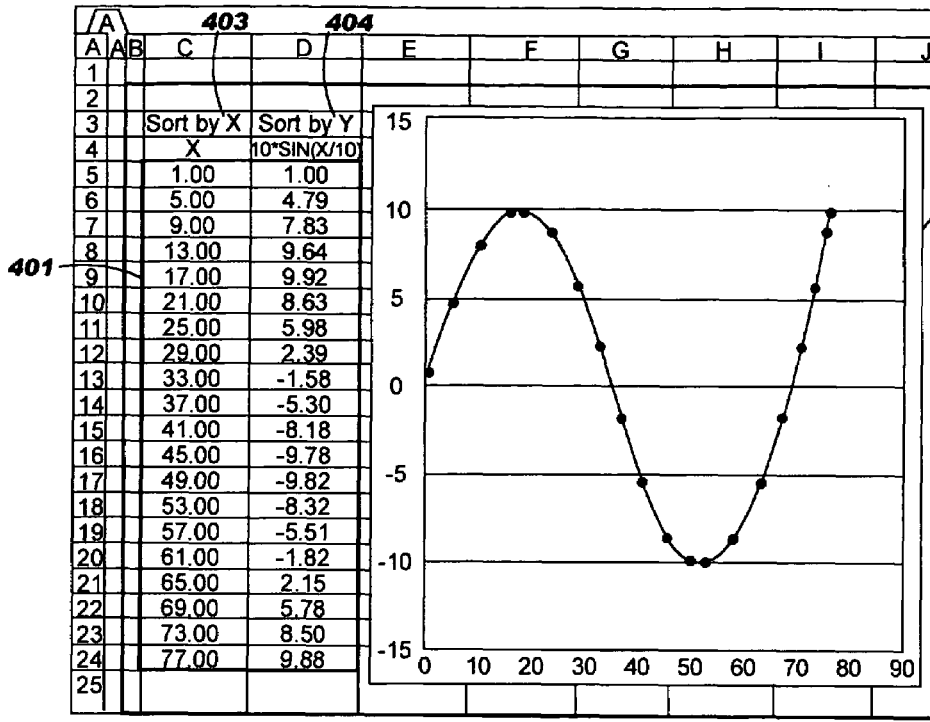
Figure 4B:
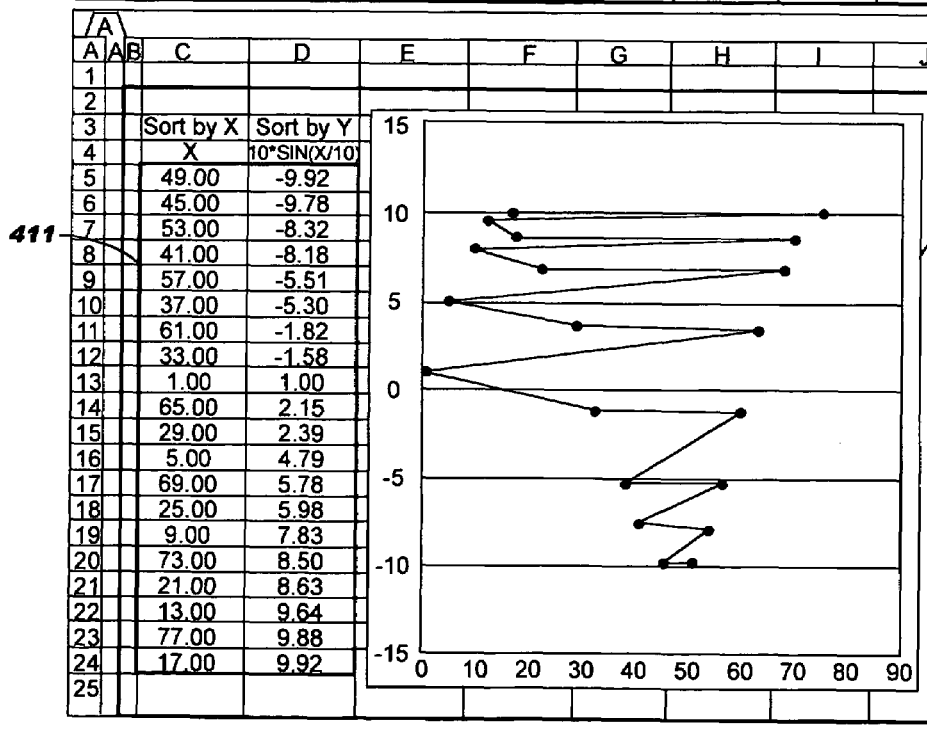

This is illustrated in the example of FIG. 4A showing a portion of the display device 106 where a range of cells representing the trigonometric function Y=10*sin(X/10) is represented by a chart. This range of cell 401, delimited by a solid line, identified by its address C5 ... D24, and named as "TRIGOTABLE", contains two columns: the left one contains a set of values $X_i$ for the X variable and the right one contains the set of corresponding values $Y_i$=10*sin($X_i$/10). On the right side of the range of cells 401, the spreadsheet user has defined a chart 402 showing a plot of the trigonometric function Y=10*SIN(X/10) for the sample values represented by the range of cells 401. Above the left column of the range of cells 401, the spreadsheet user has defined a push-button 403 entitled "Sort by X" whose effect is to sort the range of cell 401 by the X values. Above the right column of the range of cells 401, the spreadsheet user has defined a push-button 404 entitled "Sort by Y" whose effect is to sort the range of cell 401 by the Y values. This effect is shown in FIG. 4B, where the named range "TRIGOTABLE" 411 has been sorted by the rightmost column, so that the resulting chart 412 shows a different curve than the one shown in the chart 402 of FIG. 4A.

Working Ranges of Cells (WROC)

The push-button objects 403 and 404 and the chart object 402 illustrated in the example of FIG. 4A are all associated with the range of cells 401. Indeed the two push-button objects 403 and 404 allow sorting of the range of cells 401, and the chart object 402 gives a graphical representation of a function Y=10*SIN(x/10) whose sample values constitute the range of cells 401. For each of these three objects 402, 403 and 404, the range of cells 401 will be referred to as a "Working Range of Cells" or WROC. More generally, any range of cells handled by a graphical object in an electronic spreadsheet will be referred to as a "Working Range of Cells" or WRoC associated to this object. Within an object oriented software engineering environment, this can be formally specified through the definition of a specific object property associated with the object representing a push-button or a chart.

Fastening Ranges of Cells (FRoC)

In conventional electronic spreadsheets, objects like push-buttons or charts can be fasten to a range of cells. When such graphical objects are created, they fasten by default to the range of cells delimited by their top left and bottom right corners. An object fastened in this way can move and change size with the cells behind it. For example they can move and change their size when columns and rows are either inserted or deleted, or when the column widths or the row heights are changed. The range of cells to which such an object is fastened will be referred to as the "Fastening Range of Cells" or FRoC. In the example of FIG. 4A, the push-button object 403 is fasten to the FRoC made of a single cell with address A:C3; the push-button object 404 is fasten to the FRoC made of a single cell with address A:D; the chart object 402 is fasten to the FRoC with address A:E3 ... A:I24.

How are WRoC treated when FRoC are copied/cut and pasted?

Figure 4C:
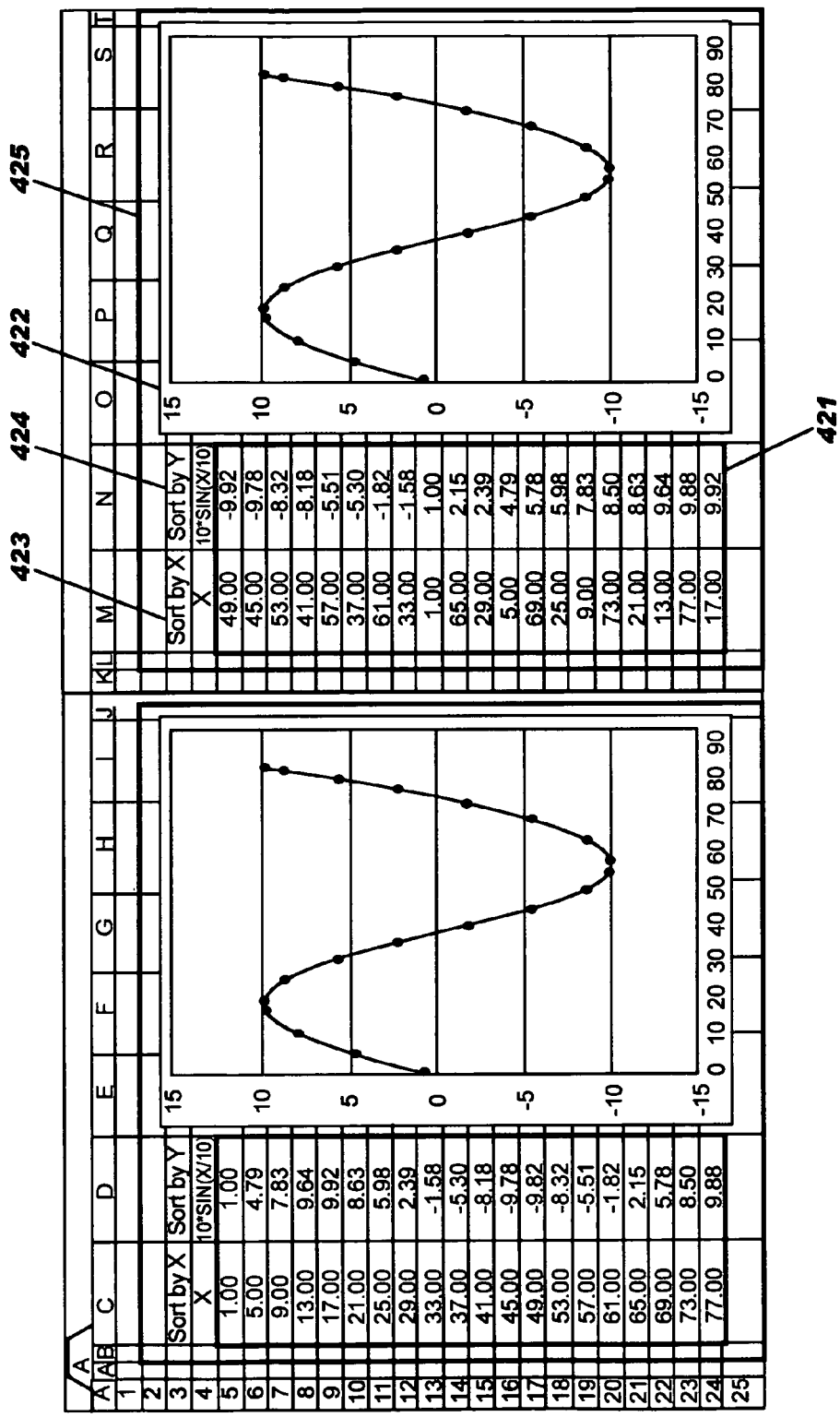

Consider a typical case, which is illustrated by FIG. 4C. Here is shown the result of a copy and paste operation where the spreadsheet user has first selected a range of cells 405 with address A:B2 ... A:J25 (this range of cells 405 is delimited by a double line border), then copied this range of cells 405 to the clipboard, then selected another range of cells 425 with address A:L2 ... A:T25, and finally performed a paste operation. This results in copying and pasting the content of all the cells from range of cells 405 onto the range of cells 425, copying and pasting all the cell display attributes from range of cells 405 onto the range of cells 425, and copying and pasting the graphical objects from range of cells 405 onto the range of cells 425. The result of this operation is that the range of cells 425 contains a range of cells 421 with the same values as the original range of cells 401, a pair of push-buttons 423 and 424, and a chart object 422. The graphical objects 422, 423 and 424 own the same attributes as the original graphical objects 402, 403, and 404. Unfortunately, they are all associated with the original WRoC 401 instead of being associated with its copied and pasted version, that is the range of cells 421. In short, a range of cells 405 containing one FRoC and one WRoC associated with the same graphical object, is copied and pasted onto another range of cells 425. This copied and pasted range of cells 425 contains a copied and pasted version of the original object, with the associated FRoC belonging to the copied and pasted range of cells 425, whereas the associated WRoC still corresponds to the original WRoC. This situation cannot be perceived as normal: any click on the push-button 423 or 424 will sort the range of cells 401 instead of the range of cell 421. A similar problem appears with the graph object 422: any change in the values of the range of cells 421 will not be reflected in the graph object 422, which instead reflects the values found in the range of cells 401.

The above problem becomes even more severe in the case of a cut and paste operation. This is reflected in FIG. 4D showing the result of a cut and paste operation applied to the same objects as the ones involved in the copy and paste operation whose effect is shown in FIG. 4C. Within the range of cells 435 created by the cut and paste operation, the graph object 432 does not show any curve, as its associated WRoC corresponds to the WRoC of the original object which has been cut and which is thus empty. Within the same range of cells 435, any click on the push-button objects 433 and 434 results in execution errors, as the associated macro or script instructions manipulate ranges which have disappeared. Finally any change in the values of the range of cells 431 will not be reflected in the graph object 432.

The present invention offer a user-friendly solution to these problems by enabling the electronic spreadsheet user to select a new mode of copy/cut and paste operation of a range of cells by which the WRoC associated with the copied/cut and pasted version of a graphical object is equal to the copied/cut and pasted version of the WRoC associated with the original graphical object, when this graphical object has a FRoC and a WRoC which are included in the copied/cut and pasted range of cells. In the following, the corresponding new Paste method will be referred to as the "Comprehensive Paste" method.

B. WRoC Table

The decision to perform a copy/cut and paste operation according to the Comprehensive Paste method between a source range of cells and a destination range of cells belongs to the spreadsheet user. When this operation occurs, a common repository associated with each graphical object like a push-button or a graph, called the "WRoC Table" is used to record the data required by this operation. This WRoC Table is preferably saved on a non volatile memory (typically but not necessary as part of the spreadsheet disk file on the mass storage 107) and is preferably associated with a method of the graphical object, when object oriented software engineering techniques are used.

Referring now to FIG. 6, the WRoC Table 600 associated with a given graphical object corresponds to a simple logical structure made of several records 601, each of which corresponds to a WRoC associated with this graphical object. Each record includes two fields:

The "WRoC" 602 field is used for identifying uniquely the working range of cells within the spreadsheet. For instance, the Source Range may correspond to the conventional address structure Sheet:RowColumn . . . Sheet:RowColumn associated to every range of cells (For example D:E10 . . . D:G20 with D as Sheet name, E and G as Row name/number, 10 and 20 as Column name/number). This field may include one or several occurrences of the "$" character to identify a relative address, or an absolute address, or the absolute coordinates within a mixed address.

The "Reference Type" 603 field is used for identifying whether the WRoC is referenced as a relative address or as an absolute address or even as a mixed address. This field 603 can respectively take the values RELATIVE, or ABSOLUTE, or MIXED, if the number of "$" characters in the field 602 is found equal to zero, or is found equal to the number of address coordinates, or is found less than the number of address coordinates and strictly positive.

The management of this table is itself conventional and straight forward. Any range of cells, once explicitly or implicitly declared as a working range of cells associated with a given graphical object by the electronic spreadsheet user, results in the introduction of a new record 601 within the WRoC Table associated with the same graphical object. The various means used for explicitly or implicitly specifying if a given range of cells is a WRoC associated with a graphical object are implementation dependent and are therefore not considered as part of the present invention.

C. Scenario

In contrast to the just-described conventional tools, the present invention provides a more powerful, user-friendly, and interactive approach for handling WRoC during a cut/copy and paste operation, in a form of a so-called "Comprehensive Paste" method.

In a preferred embodiment, the present invention may be used in two steps:

1. The first step occurs when the spreadsheet user decides whether a given range of cells should be cut or copied to memory (the underlying memory space being known as the clipboard).

The user first selects the relevant range of cells by using the pointing device 105 or the keyboard 104 and then invokes the conventional commands called "copy" or "Cut" using conventional means available in a spreadsheet environment, such as (but not limited to) dedicated push-buttons, keyboard entry short cuts, and menu or sub-menu entries.

At completion of one of these two conventional commands, the selected range of cells, as well as any fastened graphical object it contains, have been copied by conventional internal routines of spreadsheet program into the memory 102 of the computer system.

2. The second step occurs when the spreadsheet user decides to take advantage of the present invention while the content of the clipboard is pasted onto a given destination range of cells.

The spreadsheet user first selects the relevant destination ranges of cells by using conventional means, such as (but not limited to) the pointing device 105 or the keyboard 104.

Figures 3A, 3B:
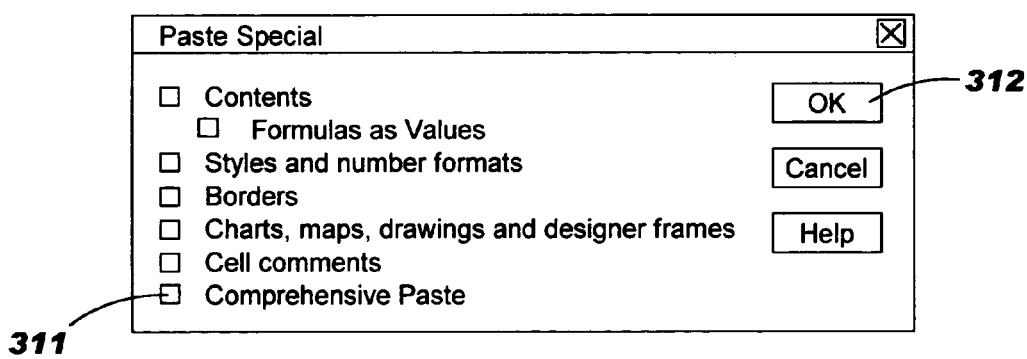
FIGS. 3A, and 3B illustrate a preferred spreadsheet user interface for invoking the "paste" operation, according to the present invention.

Then the spreadsheet user invokes an original specific command called "Comprehensive_Paste" using conventional means available in spreadsheet environment, such as (but not limited to) dedicated push-buttons, keyboard entry short cuts, and menu or sub-menu entries. In a preferred embodiment of the present invention, the Comprehensive_Paste command is invoked by clicking with the pointing device 105 first on the conventional "Paste Special" menu entry 301 within the conventional "Edit" menu 300, as shown in FIG. 3A, then on a specific check box 311 "Comprehensive Paste" introduced within the conventional "Paste Special" dialogue box 310, as shown in FIG. 3B, and then on the "OK" push-button 312 available within this same dialog box "Paste Special" 310.

D. Comprehensive_Paste Method

Figure 5B:
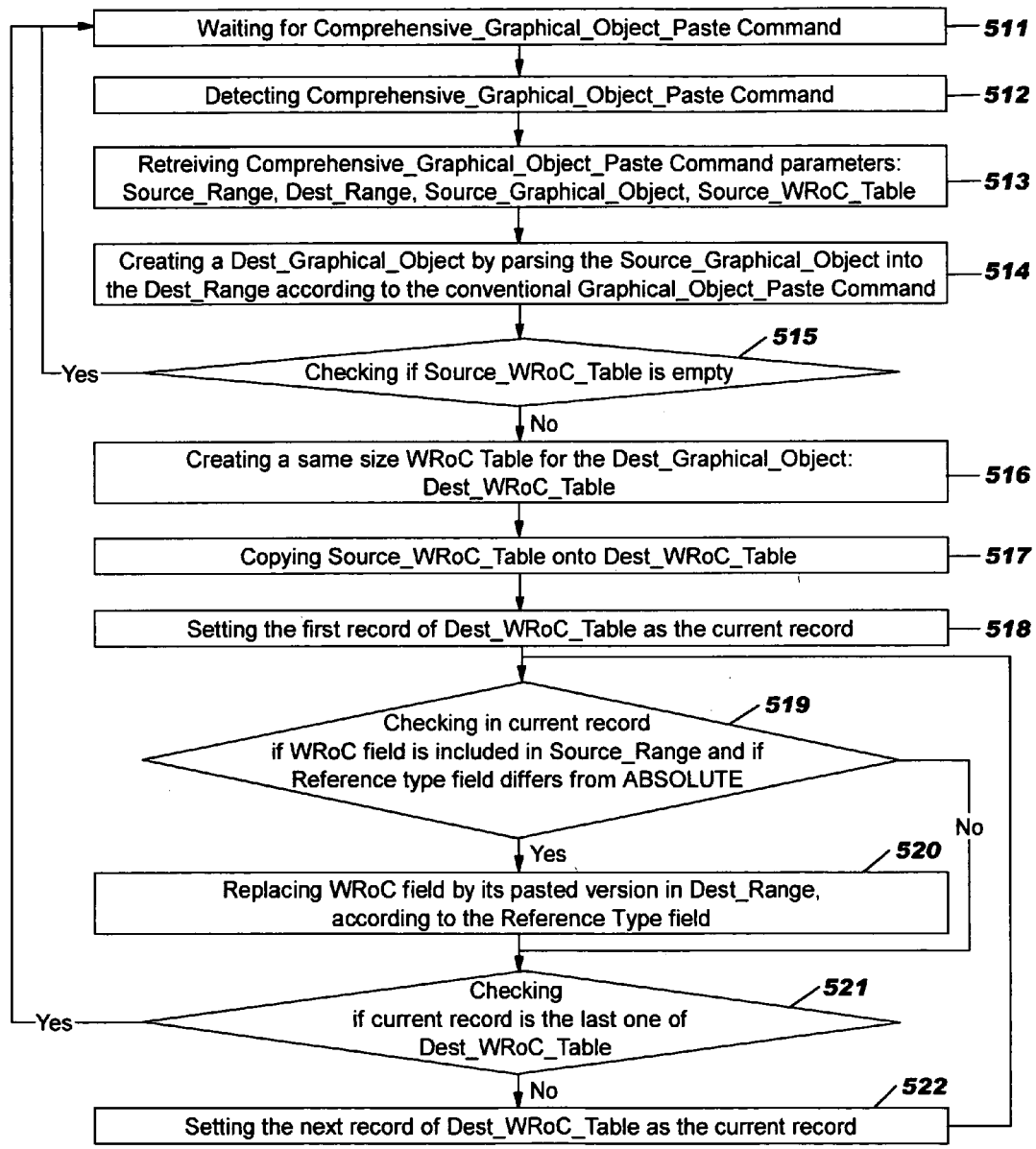

The method for handling WRoC during a paste operation to take advantage of the present invention may be split into two parts, which are summarised in flowchart 500 of FIG. 5A and in flowchart 510 of FIG. 5B. The first part of the method may be seen as the pre-processing of the "Comprehensive Paste" command, and the second part of the method may be seen as the processing of the "Comprehensive Paste" command.

The first part of the method comprises the following steps:

At step 501, the method is in its default state, waiting for an event to initiate the process.

At step 502, the "Comprehensive_Paste" command is detected, as a result of an user action. This action may be for instance a specific combination of key on the keyboard 104, or the click of the pointing device 105 on a specific button, or any other similar means not further specified here.

At step 503, a Boolean variable named "Comprehensive_Flag" is set to the value TRUE.

At step 504, an improved version of the conventional Paste command is invoked. The execution of the conventional Paste command involves different conventional sub-processes, one of which takes care of pasting any graphical object whose FRoC is included in the last cut or copied range of cells. This conventional sub-process will be referred to as the "Graphical_Object_Paste" sub-process. The improved version of the conventional Paste command differs from the conventional Paste command by replacing the "Graphical_Object_Paste" sub-process by another sub-process referred to as the "Comprehensive_Graphical_Object_Paste". The description of this sub-process is given in the flowchart 510 of FIG. 5B.

At step 505, the Boolean variable named "Comprehensive_Flag" is set to the value FALSE. Then control returns to the initial step 501 for handling any new command initiated by the electronic spreadsheet user.

The second part of the method corresponds to a modified version of the conventional sub-process "Graphical_Object_Paste" in charge of pasting any graphical object whose FRoC is found included in the last cut or copied range of cells. This new version is known as the "Comprehensive_Graphical_Object_Paste" and comprises the following steps:

At step 511, the method is in its default state, waiting for an event to initiate the process.

At step 512, the "Comprehensive_Graphical_Object_Paste" command is detected, typically as a result of an invocation as part of the step 504 previously described.

At step 513, the parameters of the "Comprehensive_Graphical_Object_Pastel" command are retrieved:

Source_Range identifying the source range of cells involved in the current copy/cut and paste operation;

Dest_Range identifying the destination range of cells involved in the current copy/cut and paste operation, Source_Graphical_Object identifying the graphical object (whose FRoC is included in Source_Range) handled by the process, and Source_WRoC_Table identifying the WRoC table associated to the object Source_Graphical_Object.

At step 514, the conventional process Graphical_Object_Paste is followed to create the copied/cut and pasted version of the Source_Graphical_Object. The resulting graphical object, referred to as Dest_Graphical_Object, has a FRoC with the same relative address within the Dest_Range range of cells as the relative address of the FRoC of Source_Graphical_Object within the Source_Range range of cells. In other words, the address offset between the FROC of Dest_Graphical_Object and the FRoC of Source_Graphical_Object is equal to the address offset between Dest_Range and Source_Range.

At step 515, a test is performed to check if the Source_WRoC_ Table is empty. If it is empty, then control is given back to the initial step 511, for handling any new command invocation. Otherwise, control is given to the step 516.

At step 516, a WRoC table is created and associated with the graphical object Dest_Graphical_Object. This graphical object, referred to as Dest_WRoC_Table, has the same size as the Source_WRoC_Table, that is contains as many records as structure 601, as illustrated in FIG. 6.

At step 517, the WRoC table Source_WRoC_Table is copied onto the WRoC table Dest_WRoC_Table.

At step 518, the first record 601 of the Dest_WRoC_Table is set as the current record of Dest_WRoC_Table.

At step 519, a test is performed on the current record of Dest_WRoC_Table to determine if the WRoC field 602 is included in the Source_Range range of cells, and if the Reference Type field 603 is found different from ABSOLUTE. If this is the case, then control is given to step 520. Otherwise control is given to step 521.

At step 520, the WRoC field 602 of the current record of the Dest_WRoC_Table is replaced by its copied/cut and pasted version within the Dest_Range range of cells. In other words, the relative offset of the WRoC field 602 within the Source_Range range of cells at the beginning of the step 520 is equal to the relative offset of the WRoC field 602 within the Dest_Range range of cells at the end of the step 520.

At step 521, a test is performed to determine if the current record 601 of the Dest_WRoC_Table is the last record 601 of Dest_WRoC_Table. If it is the last record, then control is given back to the initial step 511, for handling any new command invocation. Otherwise, control is given to the step 522.

At step 522, the next record 601 of the Dest_WRoC_Table following the current record 601 becomes the new current record 601 of the Dest_WRoC_Table. Then control is given to the step 519 for continuing with the records 601 of the Dest_WRoC_Table.

The Comprehensive_Paste method and system according to the present invention may also be used advantageously in environments where elements of information are organized as multi-dimensional tables having more than three dimensions.

The Comprehensive_Paste method and system according to the present invention may be used advantageously also in those situations where a given source range of cells is cut/copied and pasted onto multiple destination ranges of cells.

While the invention has been particularly shown and described with reference to a preferred embodiment, it will be understood that various changes in form and detail may be made therein without departing from the spirit and scope of the invention.

What is claimed is:

1. A method of copying and pasting a source range of cells onto a destination range of cells in a multi-dimensional spreadsheet comprising a plurality of cells identified by a cell address along each dimension, a range of cells comprising at least one cell, said source range of cells comprising at least one working range of cells, and at least one fastening range of cells in which at least one graphical object is represented, said at least one graphical object being associated with said at least one working range of cells, the method comprising the steps of:

selecting a source range of cells;

performing a comprehensive paste operation, comprising the steps of selecting a destination range of cells, and copying onto the selected destination range of cells, the selected source range of cells with a graphical object whose fastening range of cells is included in the source range of cells; and for the graphical object, determining that a means for identifying the working range of cells within the source range of cells are not absolute; and for a working range of cells associated with the graphical object, replacing means for identifying the working range of cells within the source range of cells with means for identifying the working range of cells within the destination range of cells responsive to said determining that the means for identifying are not absolute.

2. The method of claim 1, further including the step of clearing the source range of cells of the graphical object.

3. The method of claim 1, further including the step of:

copying the source range of cells onto a buffer with the graphical object, wherein said step of copying onto the selected destination range of cells further comprises the step of copying content of said buffer onto the selected destination range of cells.

4. The method of claim 1, wherein the graphical object is a push-button linked to a piece of code which when activated, processes the working range of cells.

5. The method according to claim 1, wherein the graphical object is a chart for representing the working range of cells on a graphic.

6. The method according to claim 1, wherein the fastening range of cells is defined by default by a top left and a bottom right corner of the graphical object as represented on the spreadsheet.

7. The method of claim 1, further comprising the preliminary steps of:

creating a source table for the graphical object;

associating the source table with the graphical object;

for the working range of cells associated with the graphical object, storing in the table means for identifying the working range of cells; and storing, in the table, means for determining whether the working range of cells is associated with the graphical object through an absolute identifying means.

8. The method of claim 7, wherein the step of copying onto the selected destination range of cells, further comprises the steps of:

creating a destination table for the graphical object and associating said destination table with the graphical object; and copying content of the source table onto the destination table.

9. The method of claim 8, wherein the step of replacing, comprises the further step of:

replacing in the destination table the means for identifying the working range of cells within the source range of cells with means for identifying the working range of cells within the destination range of cells if the means for identifying are not absolute.

10. The method according to claim 1, wherein a relative address offset between a working range of cells within the source range of cells and a working range of cells within the destination range of cells is equal to a relative offset between the source range of cells and the destination range of cells.

11. A method copying and pasting cells in a multi-dimensional spreadsheet, said method comprising:

copying and pasting a source range of cells onto a destination range of cells in the spreadsheet by performing a comprehensive paste of the source range of cells onto the destination range of cells, wherein a graphical object in the source range of cells has an associated fastened range of cells comprised by the source range of cells and an associated working range of cells comprised by the source range of cells, wherein the working range of cells of the graphical object in the source range of cells is identified by a first relative offset of the working range of cells within the source range of cells, wherein said copying and pasting results in the graphical object being comprised by the destination range of cells, and wherein said copying and pasting further results in the fastened range of cells and the working range of cells of the graphical object in the source range of cells being respectively pasted into an associated fastened range of cells and an associated working range of cells in the destination range of cells.

12. The method of claim 11, wherein a second relative offset of the working range of cells in the destination range of cells is equal to the first relative offset.

13. The method of claim 12, wherein the method further comprises creating a source table for the working range of cells of the graphical object in the source range of cells such that the source table comprises the first relative offset.

14. The method of claim 13, wherein said copying and pasting the source range of cells onto the destination range of cells comprises:

creating a destination table for the graphical object for the working range of cells of the graphical object in the destination range of cells such that the destination table comprises the second relative offset as being equal to the first relative offset; and using the destination table to paste the working range of cells of the graphical object in the source range of cells into the working range of cells of the graphical in the destination range of cells.

15. The method of claim 11, wherein the fastened range of cells and the working range of cells of the graphical object in the source range of cells is a same range of cells in the source range of cells.

16. The method of claim 11, wherein the fastened range of cells and the working range of cells of the graphical object in the source range of cells are different ranges of cells in the source range of cells.

17. The method of claim 11, wherein the working range of cells of the graphical object in the source range of cells consists of one cell in the spreadsheet.

18. The method of claim 11, wherein the working range of cells of the graphical object in the source range of cells consists of a plurality of cells in the spreadsheet.

19. The method of claim 11, wherein the fastened range of cells of the graphical object in the source range of cells consists of one cell in the spreadsheet, and wherein the working range of cells of the graphical object in the source range of cells consists of a plurality of cells in the spreadsheet.

20. The method of claim 11, wherein the graphical object is a push-button or a graph of a function.

* * * * *